United States Patent
Jang et al.

(10) Patent No.: US 6,516,112 B1
(45) Date of Patent: Feb. 4, 2003

(54) OPTICAL WAVELENGTH FILTER AND DEMULTIPLEXER

(75) Inventors: Joo-nyung Jang, Suwon (KR); Kyung-ho Kwack, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 550 days.

(21) Appl. No.: 08/980,308

(22) Filed: Nov. 28, 1997

(30) Foreign Application Priority Data

Nov. 28, 1996 (KR) .......................... 96-59175

(51) Int. Cl.$^7$ ................................. G02B 6/28
(52) U.S. Cl. ..................................... 385/24
(58) Field of Search ................... 385/24, 14, 15, 385/17; 359/115, 124, 132, 127

(56) References Cited

U.S. PATENT DOCUMENTS

| | | | |
|---|---|---|---|
| 4,923,271 A | 5/1990 | Henry et al. | 359/130 |
| 5,365,344 A | 11/1994 | Eda et al. | 359/124 |
| 5,414,548 A | 5/1995 | Tachikawa et al. | 385/14 |
| 5,446,809 A | 8/1995 | Fritz et al. | 385/17 |
| 5,448,390 A | 9/1995 | Tsuchiya et al. | 359/132 |
| 5,457,760 A | 10/1995 | Mizrahi | 385/37 |
| 5,487,120 A | 1/1996 | Ghoy et al. | 385/24 |
| 5,488,500 A | 1/1996 | Glance | 359/127 |
| 5,608,825 A | 3/1997 | Ip | 385/24 |
| 5,615,289 A | 3/1997 | Duck et al. | 385/24 |
| 5,615,290 A | 3/1997 | Harasawa et al. | 385/24 |
| 5,627,925 A | 5/1997 | Alferness et al. | 385/17 |
| 5,652,814 A | 7/1997 | Pan et al. | 385/24 |
| 5,657,406 A | 8/1997 | Ball | 385/24 |
| 5,726,785 A * | 3/1998 | Chawki et al. | 359/130 |
| 5,742,416 A * | 4/1998 | Mizrahi | 359/134 |
| 5,748,349 A * | 5/1998 | Mizrahi | 359/130 |
| 5,748,350 A * | 5/1998 | Pan et al. | 359/130 |
| 5,748,814 A * | 5/1998 | Painchaud et al. | 385/37 |
| 5,920,413 A * | 7/1999 | Miyakawa et al. | 359/122 |
| 5,926,300 A * | 7/1999 | Miyakawa et al. | 359/124 |

FOREIGN PATENT DOCUMENTS

| | | |
|---|---|---|
| EP | 0 713 110 A1 | 5/1996 |
| EP | 0794 629 A2 | 9/1997 |

OTHER PUBLICATIONS

Tomine Jean–Baptiste et al., "Télècommunications: une nouvelle gènèration de rèseaux sous–marins", Revue Generale De L'Electricite et De L'Electronique, FR, Revue Generale De L'Electrocite S.A. No. 6, pp. 51–57.(ISSN: 1265–6534) No Date Provided.

* cited by examiner

Primary Examiner—Ellen E. Kim
(74) Attorney, Agent, or Firm—Robert E. Bushnell, Esq.

(57) ABSTRACT

A low-loss, high-efficiency optical demultiplexer has a plurality of first optical devices and a plurality of second optical devices serially connected among the first optical devices. Each first optical device has first, second and third ports, receives an input optical signal via the first port, directs the input optical signal to the second port, and directs an optical signal returning via the second port only to the third port. Each second optical device has fourth and fifth ports connected between the first port of a corresponding first optical device and the second port of another corresponding first optical device, reflects only an optical signal having a corresponding wavelength component in the optical signal received via the fourth port, and passes an optical signal having the other wavelength components to the fifth port. In the second optical devices, different wavelength components of an optical signal received via the fourth port are reflected. In addition, optical signals having respective wavelength components reflected from the second optical devices are received in the first optical device via the second port thereof, and output from the first optical device via the third port thereof. In the present invention, power loss of a divided optical signal is far less than in a conventional 1×n coupler method.

10 Claims, 5 Drawing Sheets

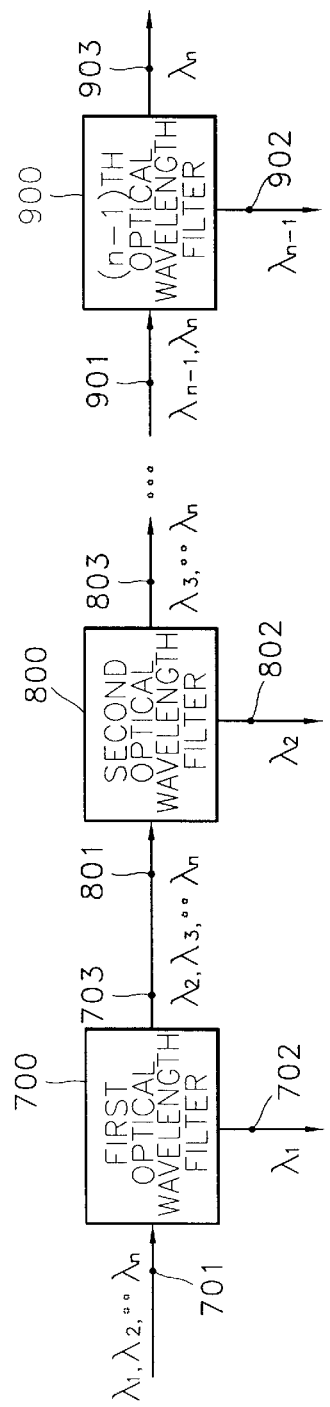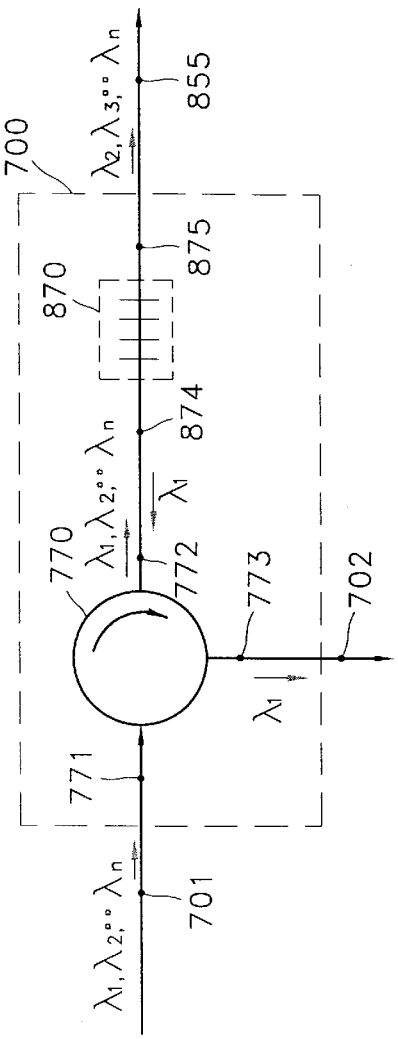

OPTICAL WAVELENGTH FILTER AND DEMULTIPLEXER

CLAIM OF PRIORITY

This application makes reference to, incorporates the same herein, and claims all benefits accruing under 35 U.S.C. §119 from an application for OPTICAL WAVELENGTH FILTER AND DEMULTIPLEXER earlier filed in the Korean Industrial Property Office on the Nov. $28^{th}$, 1996 and there duly assigned Ser. No. 59175/1996.

BACKGROUND OF THE INVENTION

1. Technical Field

The present invention relates to an optical wavelength filter and an optical demultiplexer for a receiver of a wavelength division multiplexing (WDM) transmission system and, more particularly, to an optical wavelength filter and an optical demultiplexer for a low-loss, high-efficiency WDM transmission system.

2. Related Art

A WDM transmission system multiplexes the wavelength area of an optical fiber into several channels by simultaneously transmitting signals of several wavelength bands, relying on wavelength characteristics of an optical signal. In the WDM transmission system, an input optical signal, having been multiplexed so as to have several wavelength components, is demultiplexed at the receiver and recognized in the respective channels.

Typically, an optical demultiplexer for a receiver of a conventional WDM transmission system includes a coupler, that is, a passive device for branching an input channel into several output channels, and a plurality of band pass filters, one for each output channel, for passing respective wavelength components of the output channel of the coupler. A substantial problem in the operation of such a demultiplexer resides in the fact that processing of the input optical signal in the coupler results in generation of a plurality of output optical signals, each of which is reduced in power by a factor proportional to the number of output channels of the coupler. As explained in more detail below, attempts have been made to compensate for this power loss (for example, by provision of an optical amplifier at the input side of the coupler), but such solutions are undesirable and have certain disadvantages. Therefore, there is a need in the prior art to provide an optical wavelength filter for reflection of an optical signal having a predetermined wavelength component without power loss, and to provide an optical demultiplexer for a receiver in an optical WDM transmission system providing little or minimal power loss.

The following patents are considered to be representative of the prior art relative to the present invention, and are burdened by the disadvantage discussed above: U.S. Pat. No. 5,657,406 to Ball, entitled Efficient Optical Wavelength Multiplexer/De-Multiplexer, U.S. Pat. No. 5,652,814 to Pan et al., entitled Integrable Fiberoptic Coupler And Resulting Devices And Systems, U.S. Pat. No. 5,627,925 to Alferness et al., entitled Non-Blocking Optical Cross-Connect Structure For Telecommunications Network, U.S. Pat. No. 5,615,290 to Harasawa et al., entitled Branch Device For Optical Multiplex System, U.S. Pat. No. 5,615,289 to Duck et al., entitled Bandpass Optical Filter, U.S. Pat. No. 5,608,825 to Ip, entitled Multi-Wavelength Filtering Device Using Optical Fiber Bragg Grating, U.S. Pat. No. 5,488,500 to Glance, entitled Tunable Add Drop Optical Filtering Method And Apparatus, U.S. Pat. No. 5,487,120 to Choy et al., entitled Optical Wavelength Division Multiplexer For High Speed, Protocol-Independent Serial Data Sources, U.S. Pat. No. 5,457,760 to Mizrahi entitled Wavelength Division Optical Multiplexing Elements, U.S. Pat. No. 5,448,390 to Tsuchiya et al., entitled Wavelength Division Multiplex Bothway Optical Communication System, U.S. Pat. No. 5,446,809 to Fritz et al., entitled All Fiber Wavelength Selective Optical Switch, U.S. Pat. No. 5,414,548 to Tachikawa et al., entitled Arrayed-Wave Guide Grating Multi/Demultiplexer With Loop-Back Optical Paths, U.S. Pat. No. 5,365,344 to Eda et al., entitled System For Transmitting Data Using Wavelength Division Multiplexing, and U.S. Pat. No. 4,923,271 to Henry et al., entitled Optical Multiplexer/Demultiplexer Using Focusing Bragg Reflectors.

SUMMARY OF THE INVENTION

It is an object of the present invention to provide an optical wavelength filter for reflecting an optical signal having a predetermined wavelength component without power loss.

It is another object of the present invention to provide an optical demultiplexer for a receiver in an optical WDM transmission system, which allows little power loss.

Accordingly, to achieve the above first object, there is provided an optical wavelength filter. The optical wavelength filter has a first optical device and a second optical device. The first optical device includes first, second and third ports, receives an input optical signal having a plurality of wavelength components, directs the input optical signal to the second port, and directs an optical signal returning from the second port only to the third port.

The second optical device includes fourth and fifth ports. The fourth port is connected to the second port of the first optical device. The second optical device reflects only an optical signal having a predetermined wavelength component in the optical signal received via the fourth port, and passes an optical signal having the other wavelength components to the fifth port.

To achieve the second object, there is provided an optical demultiplexer. The optical demultiplexer has a plurality of first optical devices and a plurality of second optical devices. Each of the first optical devices has first, second and third ports, receives an input optical signal via the first port, directs the input optical signal to the second port, and directs an optical signal returning from the second port only to the third port.

Each of the second optical devices has fourth and fifth ports which are connected between the second port of a corresponding first optical device and the first port of another corresponding first optical device, reflects only an optical signal having a predetermined wavelength component in an optical signal received via the fourth port backward from a light traveling direction, outputs the reflected optical signal to the corresponding first optical device via the second port thereof, and passes an optical signal having the other wavelength components to the other first optical device connected to the fifth port via the first port thereof.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 7 is a block diagram of an optical demultiplexer according to another embodiment of the present invention, and FIG. 8 is a block diagram of the first optical wavelength filter shown in FIG. 7.

DESCRIPTION OF THE PREFERRED EMBODIMENTS

Figure 1:
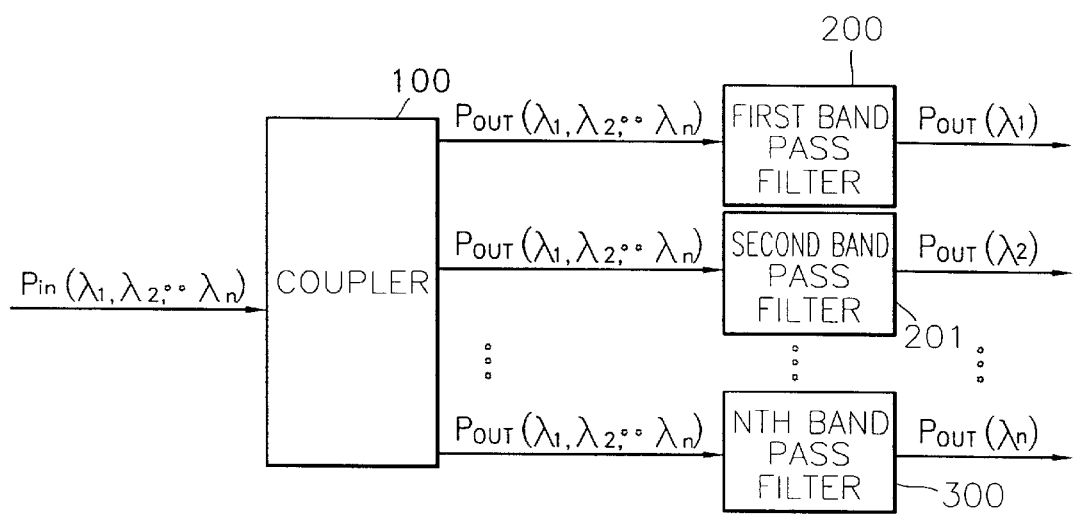
FIG. 1 is a block diagram of an optical demultiplexer for a receiver of a wavelength division multiplexing (WDM) transmission system.

FIG. 1 is a block diagram of an optical demultiplexer for a receiver in a WDM transmission system. In FIG. 1, the optical demultiplexer for the receiver of the WDM transmission system includes a 1×n coupler 100 and first thru nth band pass filters 200–300. Here, n represents the number of channels of a transmitted optical signal.

A coupler is a passive device for branching or coupling optical signals, that is, for branching an input channel into several output channels or coupling several input channels into an output channel. The 1×n coupler 100 branches an input optical signal, produced by multiplexing optical signals having many wavelength components (for example, $\lambda_1$, $\lambda_2$, ..., $\lambda_n$) into n branch optical signals $P_{out}(\lambda_1, \lambda_2, ..., \lambda_n)$, and outputs them via n respective ports. Here, the power of each branch optical signal $P_{out}(\lambda_1, \lambda_2, ..., \lambda_n)$ is (1/n)th that of the input optical signal of the 1×n coupler 100. The first through nth band pass filters 200–300 receive the branch optical signals $P_{out}(\lambda_1, \lambda_2, ..., \lambda_n)$ from the n ports, pass only their corresponding wavelength components, and output optical signals $P_{out}(\lambda_1)$, $P_{out}(\lambda_2)$, ..., $P_{out}(\lambda_n)$ of n channels having wavelength components $\lambda_1$–$\lambda_n$, respectively. Hence, the power of each of the n optical signals $P_{out}(\lambda_1)$, $P_{out}(\lambda_2)$, ..., $P_{out}(\lambda_n)$ is (1/n)th that of the input optical signal $P_{in}(\lambda_1, \lambda_2, ..., \lambda_n)$.

Figure 2:
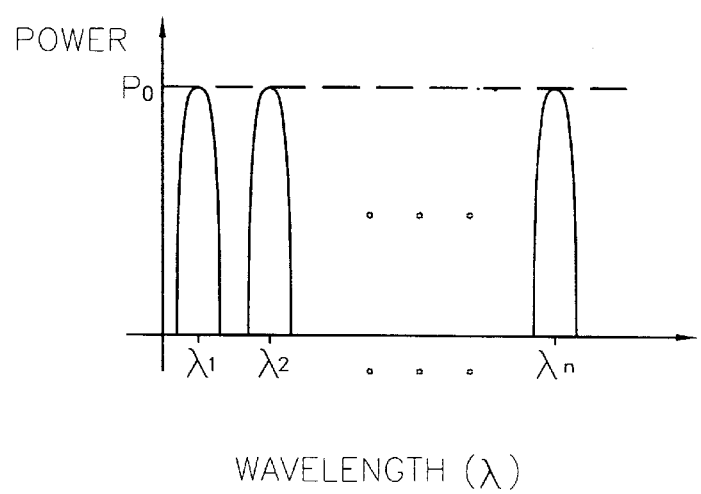
FIG. 2 is a waveform diagram illustrating the power of an optical signal received in the 1×n coupler shown in FIG. 1.

FIG. 2 is a waveform diagram illustrating the power of the input optical signal $P_{in}(\lambda_1, \lambda_2, ..., \lambda_n)$ of the 1×n coupler shown in FIG. 1. Here, $\lambda_1$–$\lambda_n$ and $P_0$ represent the wavelength components and the power value, respectively, of the input optical signal $P_{in}(\lambda_1, \lambda_2, ..., \lambda_n)$.

Figure 3:
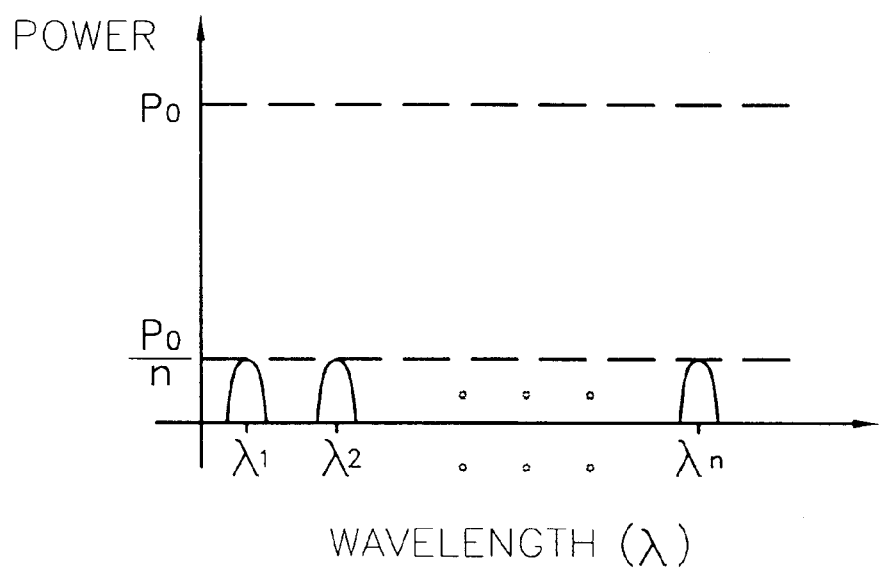
FIG. 3 is a waveform diagram illustrating the power of an optical signal received in each of the first through nth band pass filters from the 1×n coupler shown in FIG. 1.

FIG. 3 is a waveform diagram illustrating the power of the branch optical signal $P_{out}(\lambda_1, \lambda_2, ..., \lambda_n)$ output from the 1×n coupler shown in FIG. 1 to each band pass filter.

In FIG. 3, the branch optical signal $P_{out}(\lambda_1, \lambda_2, ..., \lambda_n)$ has (1/n)th the power of the input optical signal $P_{in}(\lambda_1, \lambda_2, ..., \lambda_n)$, while keeping the wavelength components of the input optical signal $P_{in}(\lambda_1, \lambda_2, ..., \lambda_n)$.

Figure 4A:
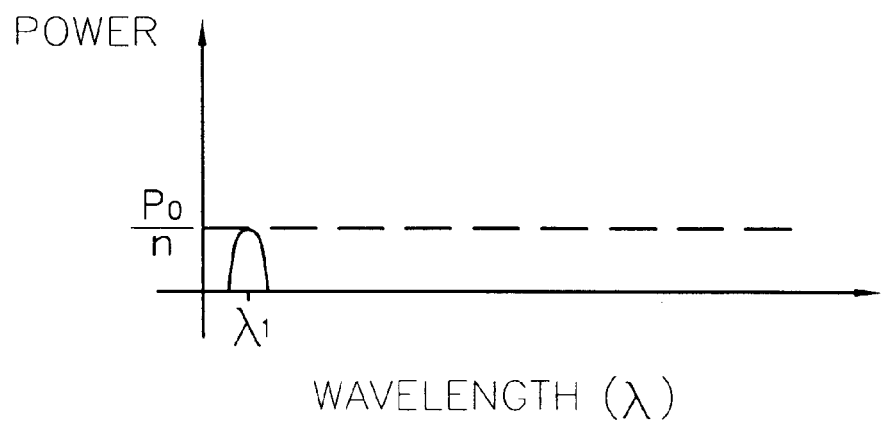
FIG. 4A is a waveform diagram illustrating the power of an optical signal output from the is first band pass filter shown in FIG. 1.
Figure 4B:
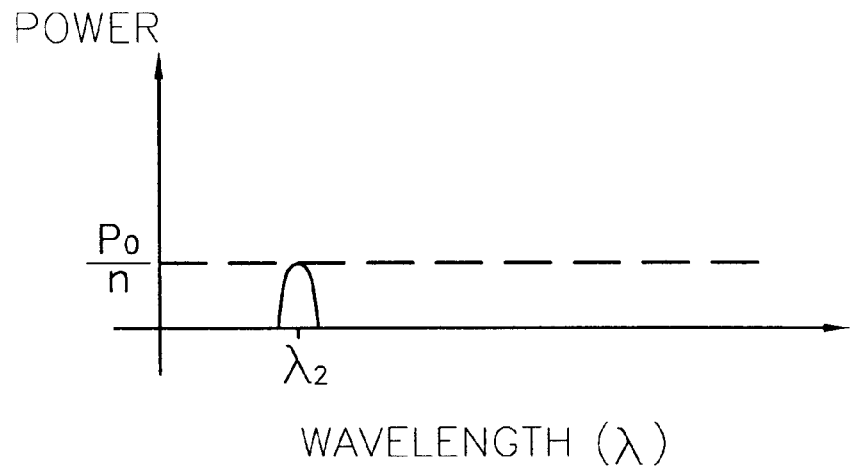
FIG. 4B is a waveform diagram illustrating the power of an optical signal output from the second band pass filter shown in FIG. 1.
Figure 4C:
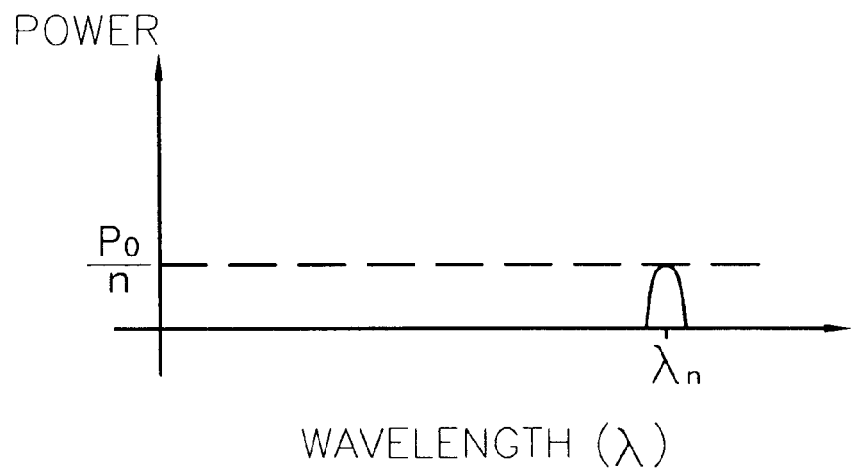
FIG. 4C is a waveform diagram illustrating the power of an optical signal output from the nth band pass filter shown in FIG. 1.

FIGS. 4A–4C are waveform diagrams illustrating the powers of optical signals $P_{out}(\lambda_1)$, $P_{out}(\lambda_2)$, and $P_{out}(\lambda_n)$ output from the first, second, and nth band pass filters shown in FIG. 1. Here, the vertical axis on the graphs indicates the powers P of the optical signals, and the horizontal axis indicates the wavelengths $\lambda$ of the optical signals. $P_0$ denotes the power value of the input optical signal $P_{in}(\lambda_1, \lambda_2, ..., \lambda_n)$, and $\lambda_1$–$\lambda_n$ denote the wavelength components multiplexed in the input optical signal $P_{in}(\lambda_1, \lambda_2, ..., \lambda_n)$. As shown in FIG. 3, the power of the branch optical signal $P_{out}(\lambda_1, \lambda_2, ..., \lambda_n)$ output from the 1×n coupler is (1/n)th that of the input optical signal $P_{in}(\lambda_1, \lambda_2, ..., \lambda_n)$, that is, $P_0/n$. Thus, each of the optical signals $P_{out}(\lambda_1)$, $P_{out}(\lambda_2)$, ..., $P_{out}(\lambda_n)$ having their respective wavelength components, which are output from the first through nth band pass filters 200–300, also have (1/n)th the power of the input optical signal $P_{in}(\lambda_1, \lambda_2, ..., \lambda_n)$, that is, $P_0/n$.

In the WDM transmission system, use of the 1×n coupler for demultiplexing a multiplexed optical signal at a receiver offers only (1/n)th the power of an input optical signal of the 1×n coupler. In order to make up for the power loss caused by this 1×n coupler, the optical demultiplexer for the receiver in the WDM transmission system further includes an optical amplifier for amplifying an optical signal to increase the power by n times before it is input to the 1×n coupler.

Figure 5:
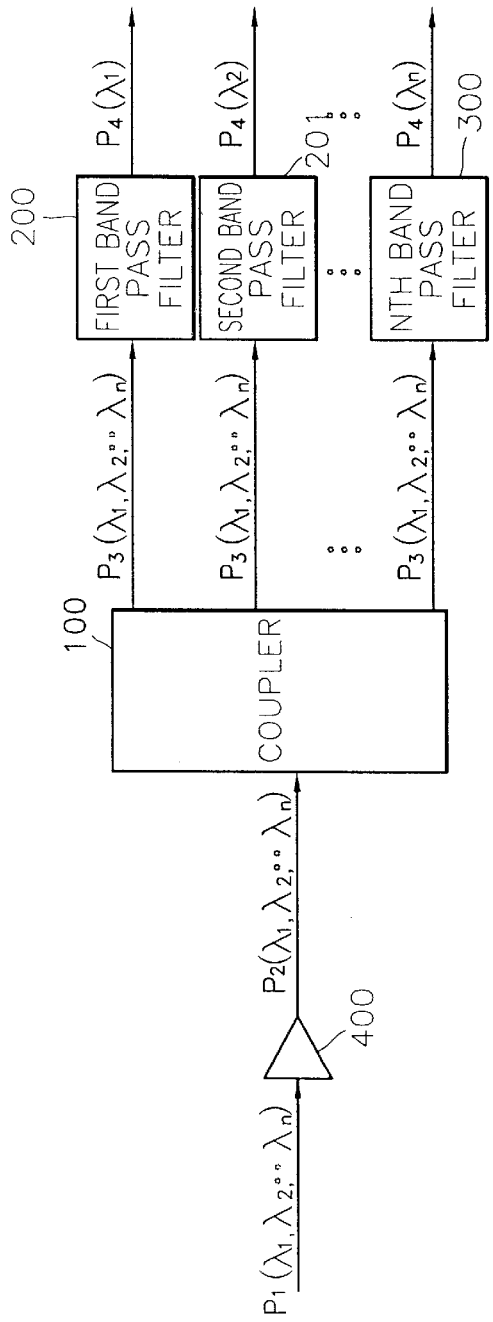
FIG. 5 is a block diagram of an optical demultiplexer for compensating for power loss caused by a 1×n coupler in a receiver of the conventional WDM transmission system.

FIG. 5 is a block diagram of the optical demultiplexer further including an optical amplifier, for the receiver in the WDM transmission system.

Referring to FIG. 5, the optical demultiplexer has an optical amplifier 400, a 1×n coupler 100, and first thru nth band pass filters 200–300. Here, n denotes the number of channels of a transmitted optical signal.

An optical signal $P_1(\lambda_1, \lambda_2, ..., \lambda_n)$ received in the optical amplifier 400 is produced by multiplexing optical signals of many wavelength components, for example, $\lambda_1, \lambda_2, ..., \lambda_n$. The optical amplifier 400 amplifies the input optical signal $P_1(\lambda_1, \lambda_2, ..., \lambda_n)$ by two or more times the number of wavelength components included in the input optical signal $P_1(\lambda_1, \lambda_2, ..., \lambda_n)$, and outputs an amplified input optical signal $P_2(\lambda_1, \lambda_2, ..., \lambda_n)$. The 1×n coupler 100 receives the amplified input optical signal $P_2(\lambda_1, \lambda_2, ..., \lambda_n)$, branches the amplified signal, and outputs n branch input optical signals $P_3(\lambda_1, \lambda_2, ..., \lambda_n)$. Here, the n branch input optical signals each have (1/n)th the power of the amplified input optical signal $P_2(\lambda_1, \lambda_2, ..., \lambda_n)$, that is, a power value as great as or greater than that of the input optical signal $P_1(\lambda_1, \lambda_2, ..., \lambda_n)$, while keeping the wavelength components included in the input optical signal $P_1(\lambda_1, \lambda_2, ..., \lambda_n)$. The first thru nth band pass filters 200–300 separate optical signals $P_4(\lambda_1)$, $P_4(\lambda_2)$, ..., $P_4(\lambda_n)$ of their corresponding wavelength components from the branch input optical signals $P_3(\lambda_1, \lambda_2, ..., \lambda_n)$. Here, the powers of the optical signals $P_4(\lambda_1)$, $P_4(\lambda_2)$, ..., $P_4(\lambda_n)$ each are larger than that of the input optical signal $P_1(\lambda_1, \lambda_2, ..., \lambda_n)$.

Figure 6:
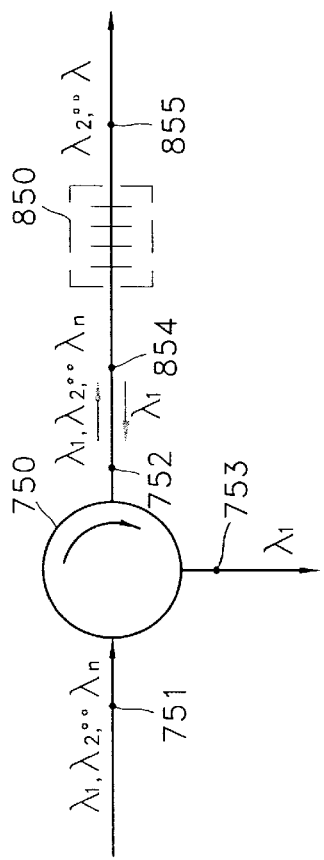
FIG. 6 is a block diagram of an optical wavelength filter according to an embodiment of the present invention.

FIG. 6 is a block diagram of an optical wavelength filter according to an embodiment of the present invention.

Referring to FIG. 6, the optical wavelength filter according to an embodiment of the present invention has a circulator 750 and a fiber grating reflection filter 850.

The circulator 750 has first thru third ports 751–753. The first port 751 receives an optical signal having a plurality of wavelength components, for example, ($\lambda_1, \lambda_2, ..., \lambda_n$) and directs the received optical signal to the second port 752.

The circulator 750 receives at port 752, the optical signal having only a wavelength component (for example, $\lambda_1$) which is reflected back from the fiber grating reflection filter 850, and directs that optical signal only to the third port 753.

The fiber grating reflection filter 850 can reflect only an optical signal having a predetermined wavelength component backward from a signal traveling direction by periodically varying the refractive index of a fiber sensitive to ultraviolet rays (that is, relying on Bragg conditions by varying the refractive index of the fiber through irradiation of ultraviolet rays onto the fiber sensitive to the ultraviolet rays).

The fiber grating reflection filter 850 includes fourth and fifth ports 854 and 855. The fourth port 854 is connected to the second port 752. The fiber grating reflection filter 850 reflects only the optical signal having the predetermined wavelength component $\lambda_1$ among the wavelength components (for example, $\lambda_1, \lambda_2, \ldots, \lambda_n$) of the optical signal received from the fourth port 854 backward from the light traveling direction to the second port 752 of the circulator 750, and outputs an optical signal having the other wavelength components $\lambda_2, \ldots, \lambda_n$ to the fifth port 855.

The optical wavelength filter according to the embodiment of the present invention is provided with the circulator 750 and the fiber grating reflection filter 850, thus separating only an optical signal having a predetermined wavelength component from an optical signal having a plurality of multiplexed wavelength components. Therefore, application of the optical wavelength filter to a WDM transmission system obviates the need for an optical amplifier used to compensate for division-incurring power loss of an optical signal in a receiver.

FIG. 7 is a block diagram of an optical demultiplexer according to an embodiment of the present invention to achieve another object of the present invention.

Referring to FIG. 7, the optical multiplexer has first thru nth optical wavelength filters 700–900 which are serially connected.

The first thru nth optical wavelength filters 700, 800 and 900 have input ports 701, 801 and 901, first output ports 702, 802 and 902, and second output ports 703, 803 and 903.

The first optical wavelength filter 700 receives an input optical signal having a plurality of wavelength components (for example, $\lambda_1, \lambda_2, \ldots, \lambda_n$) via the input port 701, and outputs only an optical signal having a wavelength component (for example, $\lambda_1$), among the wavelength components (for example, $\lambda_1, \lambda_2, \ldots, \lambda_n$) of the input optical signal, via the first output port 702. The first optical wavelength filter 700 outputs, via second port 703, an optical signal having the other non-$\lambda_1$ wavelength components (that is, $\lambda_2, \ldots, \lambda_n$) received from the first output port 702. The second optical wavelength filter 800 receives the optical signal having the other non-$\lambda_1$ wavelength components $\lambda_2, \ldots, \lambda_n$ via the input port 801 from the second output port 703. Similarly, the second optical wavelength filter 800 outputs an optical signal having a wavelength component (for example, $\lambda_2$) among the wavelength components $\lambda_2, \ldots, \lambda_n$ via the first output port 802, and an optical signal having the other wavelength components $\lambda_3, \ldots, \lambda_n$ via the second output port 803. Through this procedure, the (n−1)th optical wavelength filter 900 receives an optical signal having wavelength components $\lambda_{n-1}$ and $\lambda_n$ via the input port 901, and outputs an optical signal having a wavelength component (for example, $\lambda_{n-1}$) via the first output port 902 and an optical signal having the other wavelength component $\lambda_n$ via the second output port 903.

FIG. 8 is a block diagram of the first optical wavelength filter 700 shown in FIG. 7. The optical wavelength filter 700 includes a circulator 770 and a fiber grating reflection filter 870.

The circulator 770 has first, second and third ports 771, 772, and 773, respectively. The first port 771 is connected to the input port 701 of the optical wavelength filter 700. The circulator 770 receives an optical signal having a plurality of wavelength components (for example, $\lambda_1, \lambda_2, \ldots, \lambda_n$) via the first port 771 and outputs the optical signal to the fiber grating reflection filter 870 via the second port 772. The circulator 770 receives, at the second port 772, an optical signal having only one wavelength component (for example, $\lambda_1$), reflected back from the fiber grating reflection filter 870, and directs that optical signal only to the third port 773.

The fiber grating reflection filter 870 can reflect only an optical signal having a predetermined wavelength component backward from a signal traveling direction by periodically varying the refractive index of a fiber sensitive to ultraviolet rays (that is, relying on Bragg conditions by varying the refractive index of the fiber through irradiation of ultraviolet rays onto the fiber sensitive to the ultraviolet rays).

The fiber grating reflection filter 870 has fourth and fifth ports 874 and 875, and the second port 772 of the circulator 770 is connected to the fourth port 874. The fiber grating reflection filter 870 receives the optical signal having the wavelength components $\lambda_1, \lambda_2, \ldots, \lambda_n$ via the fourth port 874, reflects only the optical signal having the wavelength component $\lambda_1$ backward from a light traveling direction to the circulator 770 via the second input port 772, and outputs the optical signal having the other wavelength components $\lambda_2, \ldots, \lambda_n$ via the fifth port 875. The optical signal having the other wavelength components is output from the fifth port 875 to the first optical wavelength filter 700 via the second output port 703.

As described above, by constituting an optical demultiplexer of serially connected optical wavelength filters, each including a circulator and a fiber grating reflection filter, power loss of an optical demultiplexer, which is caused by an 1×n coupler of an optical demultiplexer in a receiver of the conventional WDM transmission system, can almost be eliminated.

Power loss generated when an optical signal of a plurality of wavelength components is divided into optical signals, each having a wavelength component, in the conventional optical demultiplexer and the optical demultiplexer in the present invention will be described.

For example, it is assumed that the number of channels to be transmitted is 10 and the input power of each channel is 10 mW. In the conventional optical demultiplexer, ten optical signals, branched from an 1×n coupler and having their corresponding respective wavelength components by band pass filters, each have 1 mW (that is, ¹⁄₁₀th of 10 mW). However, in the optical demultiplexer, a total loss of 2 dB is produced due to insertion loss of the circulator itself while an input 10 mW optical signal is received in the circulator, reflected by a fiber grating reflection filter to be an optical signal having a predetermined wavelength component, and output from the circulator. That is, the output power of the optical signal having the predetermined wavelength component divided from the 10 mW input optical signal is 6.3 mW. Therefore, there is no need for an optical amplifier for compensating for power loss of an optical signal caused by 1×n coupling in an optical demultiplexer of the conventional WDM transmission system.

In the present invention, by constituting an optical demultiplexer from a plurality of serially connected optical wavelength filters, each having a circulator and a fiber grating reflection filter, power loss of an optical signal caused by 1×n coupling in an optical demultiplexer of a receiver in the conventional WDM transmission system cannot be produced. Further, the optical demultiplexer of the present invention is useful in a high-density WDM transmission system for increasing transmission capacity since there is no limit to the number of divided wavelengths.

While the present invention has been illustrated and described with reference to specific embodiments, further modifications and alterations will occur to those skilled in the art within the spirit and scope of this invention.

What is claimed is:

1. An optical wavelength filter, comprising:

first optical means having first, second and third ports for receiving an input optical signal having a plurality of wavelength components at the first port, for directing the input optical signal to the second port, for receiving a reflected optical signal returning to the second port, and for directing the reflected optical signal to the third port; and second optical means having a fourth port connected directly to the second port of the first optical means for directly receiving the input optical signal directed to the second port and for reflecting only a predetermined wavelength component of the input optical signal received via the fourth port, said reflected predetermined wavelength component comprising the reflected optical signal returning to the second port, said second optical means having a fifth port and passing other wavelength components of the input optical signal to the fifth port;

wherein the second optical means comprises a fiber Bragg grating reflection filter for making a refractive index difference with a grating period having regular intervals using light interference, and for reflecting only the predetermined wavelength component backward from a light traveling direction.

2. The optical wavelength filter as claimed in claim 1, wherein the predetermined wavelength is set according to user demands by controlling the grating period according to Bragg conditions for an intended wavelength.

3. The optical wavelength filter as claimed in claim 1, wherein the first optical means comprises a circulator having an input port, a first output port and a second output port, said circulator directing the input optical signal from the input port to the first output port, and said circulator directing the reflected optical signal received via the first output port only to the second output port.

4. The optical wavelength filter as claimed in claim 3, wherein a total power loss is produced when the input optical signal is received in the circulator via the input port, is directed to the first output port, is reflected back as the predetermined wavelength component, and is output from the circulator via the second output port, and wherein the total power loss is 2 dB due to insertion loss in the circulator.

5. An optical demultiplexer, comprising:

a plurality of first optical devices, each having first, second and third ports, and each receiving a respective input optical signal via the first port, directing the respective input optical signal to the second port, receiving a respective reflected optical signal returning to the second port, and directing the respective reflected optical signal to the third port; and a plurality of second optical devices, each having fourth and fifth ports, each fourth port being connected directly to the second port of a corresponding first optical device and each fifth port being connected directly to the first port of another corresponding first optical device, each of said second optical devices receiving directly, at the fourth port, the input optical signal directed to the second port, reflecting backward from a light traveling direction only a predetermined wavelength component of the input optical signal received via the fourth port, outputting the reflected respective predetermined wavelength component directly to the second port, and passing other wavelength components of the respective input optical signal directly to said first port of said another corresponding first optical device connected directly to the fifth port.

6. The optical demultiplexer as claimed in claim 5, wherein each of the second optical devices comprises a fiber Bragg grating reflection filter for making a refractive index difference with grating periods having regular intervals using light interference, and for reflecting only the predetermined wavelength component backward from the light traveling direction.

7. The optical demultiplexer as claimed in claim 6, wherein the predetermined wavelength is set according to user demands by controlling the grating period according to Bragg conditions for an intended wavelength.

8. The optical demultiplexer as claimed in claim 6, wherein each of the second optical devices has a different respective grating period, reflects only optical signals having different wavelength components, and passes signals having the other wavelength components, so that an optical signal having a corresponding wavelength component is separated whenever an optical signal having a plurality of wavelength components passes through the plurality of second optical devices.

9. The optical demultiplexer as claimed in claim 5, wherein each of the first optical devices comprises a circulator having an input port and first and second output ports, said circulator receiving the respective input optical signal via the respective input port, directing the input optical signal to the first output port, and directing the respective reflected optical signal received via the first output port only to the second output port.

10. The optical demultiplexer as claimed in claim 9, wherein a total power loss is produced when the respective input optical signal is received in the circulator via the input port, is directed to the first output port, is reflected back as the predetermined wavelength component, and is output from the circulator via the second output port, and wherein the total power loss is 2 dB due to insertion loss in the circulator.

* * * * *